United States Patent [19]

Matsubara

[11] 4,144,283

[45] Mar. 13, 1979

[54] CURABLE COATING COMPOSITIONS

[75] Inventor: Toru Matsubara, Tokyo, Japan

[73] Assignee: Toyo Ink Manufacturing Co., Ltd., Tokyo, Japan

[21] Appl. No.: 881,280

[22] Filed: Feb. 27, 1978

Related U.S. Application Data

[63] Continuation-in-part of Ser. No. 730,500, Oct. 7, 1976, abandoned.

[51] Int. Cl.$^2$ ............... C08L 63/00; C08L 27/00; C07C 69/54
[52] U.S. Cl. ............................. 260/836; 560/221; 560/66; 260/862; 260/885; 260/899; 260/901; 526/313; 204/159.16; 204/159.22
[58] Field of Search .......... 260/47 EQ, 486 R, 486 H, 260/836, 862, 899, 901, 970 A, 885; 526/313; 204/159.16, 159.22

[56] References Cited

U.S. PATENT DOCUMENTS

| B 444,078 | 3/1976 | Stevens et al. | 260/486 R |
|---|---|---|---|
| 2,659,696 | 11/1953 | Neff | 260/47 EQ |
| 3,433,756 | 3/1969 | Seeliger et al. | 260/47 EQ |
| 3,575,925 | 4/1971 | Skoultchi | 260/486 R |
| 3,730,947 | 5/1973 | Stoffey et al. | 260/486 R |
| 3,751,399 | 8/1973 | Lee et al. | 260/486 R |
| 3,769,336 | 10/1973 | Lee et al. | 260/486 R |
| 3,770,602 | 11/1973 | D'Alelio | 260/486 R |
| 3,896,161 | 7/1975 | Borden et al. | 260/486 R |
| 3,960,795 | 6/1976 | Dowbenko et al. | 260/47 EQ |
| 3,989,740 | 11/1976 | Broussard et al. | 260/486.11 |

*Primary Examiner*—Herbert J. Lilling
*Attorney, Agent, or Firm*—Frank J. Jordan

[57] ABSTRACT

A curable coating composition for paints and printing inks, which contains an acrylic or methacrylic acid ester prepared by addition reacting a monocyclic phenolic compound such as resorcine with ethylene or propylene oxide to produce an adduct and then esterifying the thus-produced adduct with acrylic or methacrylic acid to prepare the acrylic or methacrylic acid ester.

5 Claims, No Drawings

CURABLE COATING COMPOSITIONS

This application is a Continuation-in-Part of Ser. No. 730,500 filed Oct. 7, 1976, and now abandoned.

This invention relates to a coating composition which is curable by the action of heat, ultraviolet rays or ionizing radiation.

Functional compounds which have heretofore been well known, include monofunctional monomers such as methyl methacrylate and ethyl acrylate and further include polyfunctional monomers such as glycol-(meth)acrylic acid esters illustrated by ethylene glycol di(meth)acrylate and triethylene glycol di(meth)acrylate, and polyhydric alcohol-(meth)acrylic acid esters illustrated by glycerine di(meth)acrylate, trimethylolpropane tri(meth)acrylate, pentaerithritol tri(meth)acrylate and pentaerithritol tetra(meth)acrylate. The terms "(meth)acrylate" and "(meth)acrylic acid" are intended to mean "acrylate or methacrylate" and "acrylic acid or methacrylic acid" respectively.

The conventional polyfunctional monomers when used in printing inks and paints, will raise a serious problem as to odor of the unreacted monomer after the curing operation. The conventional polyfunctional monomers such as polyfunctional (meth)acrylic acid esters, are high in viscosity and will be required to be used in large quantities with respect to the amount of resin contained in printing inks or paints thereby causing the characteristic of the resin to lose, this being disadvantageous, in cases where they are used as a diluent for these inks or paints; further, they will give brittle and insufficiently flexible films because of their rapid curability and excessively high crosslinkability due to the presence of many acryl groups per molecule thereof when they are cured as a curable solvent in reactive paints or printing inks. In addition, when coated on a base material, the paints or inks containing the curable solvent will not be satisfactory in bond strength. Particularly when an ultraviolet light curable printing ink containing the conventional polyfunctional monomer as the curable solvent is printed on a treated metallic plate and irradiated with ultraviolet rays to obtain a cured printed film on the plate, the film so obtained will be unsatisfactory in close adhesion to the metallic plate and also in subsequent workability.

In an attempt to obtain functional unsaturated compounds free of the aforesaid disadvantages, the present inventor had made intensive studies and, as a result of this studies, has found that the use of the curable solvent of a novel functional (meth)acrylic ester prepared by addition reacting a monocyclic polyhydric phenolic compound with an alkylene oxide and esterifying the thus-produced adduct with (meth)acrylic acid, will result in the production of films which are flexible without the aforesaid brittleness and are excellent in subsequent workability and bond strength.

The novel polyfunctional (meth)acrylic esters contained in the curable coating compositions for printing inks or paints according to this invention are represented by the following general formula

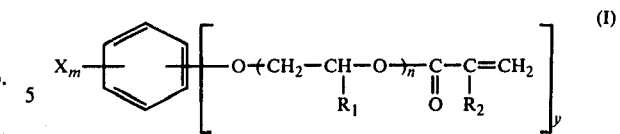

wherein X is an alkyl group having 1-18 carbon atoms, alkoxy group having 1-8 carbon atoms, halogen atom, carboxyl group or its alkyl ester wherein the alkyl group has 1-18 carbon atoms, $R_1$ and $R_2$ are a hydrogen atom or a methyl group, n an integer of 1-10, m is zero or an integer of 1-4, and y is an integer of 2 to 4, preferably 2 or 3, with the proviso that the sum of m and y is not more than 6. More particularly, the novel polyfunctional (meth)acrylic ester of the formula (I) is obtained in addition reacting a monocyclic phenolic compound expressed by the following general formula (II)

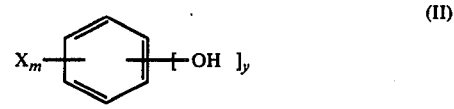

wherein m and y are as defined in the formula (I), with an alkylene oxide selected from ethylene oxide and propylene oxide to produce an adduct of the phenolic compound with the alkylene oxide, the adduct being expressed by the following general formula

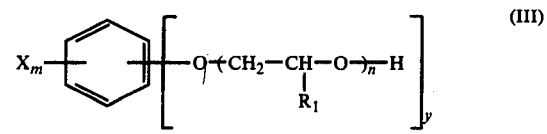

wherein $R_1$, m, n and y are as defined in the formula (I) and then esterifying the adduct of the formula (III) with acrylic or methacrylic acid thereby to obtain the novel ester of the formula (I) which is normally a liquid material.

The term "polyfunctional" used herein is intended to mean functional groups which are phenolic OH and alcoholic OH obtained by the addition reaction of alkylene oxide.

The monocyclic, phenolic compounds which may be used in this invention include polyhydric phenolic compounds such as hydroquinone, resorcin, catechol, pyrogallol, phloroglucine, cresorcinol, orcine, 2-methoxyresorcine and 4-chlororesorcine, with hydroquinone, resorcine, catechol and pyrogallol being preferred because of their inexpensiveness from the industrial viewpoint. The addition reaction with the alkylene oxide may usually be carried out at 80°-160° C. in the presence of an alkali catalyst such as sodium hydroxide. The alkylene oxides used herein include ethylene oxide and propylene oxide. The symbol "n" in the formula (I) indicates an average amount of the alkylene oxide addition reacted; if n is not less than 11 and, therefore, the number of the (meth)acryloyl groups introduced per mol of the ester decreases, then the ester will raise a problem as to the properties of to-be-formed film due to the degradation of reactivity of the ester and will simultaneously be made hydrophilic. Because of this, such an ester is undesirable particularly for the use in offset printing inks even from the viewpoint of emulsification resistance. The esterifying reaction may be effected at a temperature of generally 80°–120° C. at which the (meth)acryloyl groups are not thermally polymerized, preferably in the presence of an acid catalyst such as p-toluenesulfonic acid. Although the methacrylic acid esters have a lower viscosity than the acrylic acid esters and are therefore very effective as a diluent, they tend to be hindered from curing at the surface in air when attempted to be formed into a cured film under the action of heat, ultraviolet rays or ionizing radiation, this tendency being remarkable in cases where the curing is tried by the action of ultraviolet rays or ionizing radiation. Thus it is required that the methacrylic acid esters be cured by the action of such radiation in an inert gas stream. The acrylic acid esters are therefore more preferable than the corresponding methyacrylic acid esters.

Since the polyfunctional (meth)acrylic acid esters obtained as mentioned above are easily self-polymerized or copolymerized with an unsaturated group-containing resin and then cured by the action of heat, ultraviolet rays or ionizing radiation, they may be used as a binder component together with an unsaturated group-containing resin in curable resin compositions such as paints, overcoating varnishes and printing inks. The unsaturated group-containing resins used herein include unsaturated polyesters prepared from ethylene glycol and maleic or fumaric acid; epoxy acrylate polymers prepared by the reaction of an epoxy compound containing at least two epoxides in the molecule with acrylic acid; and resins prepared by esterifying with acrylic acid a hydroxyl group-containing resin containing as one kind of the polymerization units an unsaturated monomer such as β - hydroxyalkyl (meth)acrylate or allyl alcohol having both a polymerizable double bond and hydroxyl group in the molecule.

The binder components, that is the curable coating compositions, containing the unsaturated group-containing resin and the functional (meth)acrylic acid ester according to this invention, are curable by the action of heat ultraviolet rays or ionizing radiation and may, in many cases, preferably be incorporated with an accelerator for curing in order to promote their curing. The curing accelerators used in effecting the curing by the action of heat include organic peroxides such as benzoyl peroxide and azobis type compounds such as azobisisobutyronitrile, and those used in effecting the curing by the action of ultraviolet rays include known sensitizers, such as benzoin derivatives, benzophenone derivatives and anthraquinone derivatives. In addition, the curable coating compositions of this invention may be coated with coloring matter such as pigments, and other additives.

The curable coating compositions for printing inks of this invention will not raise any problems as to environmental pollution since they do not contain conventionally used organic solvents which do not participate in the curing and they do therefore not discharge anything by evaporation.

This invention will be better understood by the following Examples and Reference examples wherein all parts are by weight unless otherwise specified.

REFERENCE EXAMPLE 1

71.7 parts of Epikote 828 (bisphenol type epoxy resin produced by Shell Chemical Co.), 28.3 parts of acrylic acid, 0.1 part of hydroquinone and 0.1 part of triethylenediamine were added to a four-necked flask provided with a reflux condenser and agitator to form a mixture which was then reacted while blowing air into the flask, at 90°–120° C. for 15–20 hours thereby obtaining a resin having an acid value of not more than 1.

REFERENCE EXAMPLE 2

Twenty (20) parts of linseed oil fatty acid and 47 parts of trimethylolopropane were reacted together at 240° C. in a stream of carbonic acid gas in a four-necked flask to the extent that the resulting reaction mixture exhibited an acid value of not more than 5, after which the reaction mixture was incorporated with 33 parts of phthalic anhydride and reacted at the same temperature as above for 3 hours to obtain an alkyd resin having an acid value of 5 and an excessively high hydroxyl value of 310. Then a four necked flask provided with a reflux condenser was charged with 71.5 parts of the alkyd resin so obtain, 10 parts of cyclohexane, 28.5 parts of acrylic acid, 1.0 part of p-toluenesulfonic acid and 0.1 part of hydroquinone to form a mixture which was reacted under an air stream at 90° to 110° C. for 12 hours thereby producing a reaction mixture having an acid value of 10. The reaction mixture so produced was heated to 110°–120° C. for two hours to remove the cyclohexane therefrom thereby to obtain a resin having an acid value of 8.2 and a viscosity of 2000 poise/25° C.

EXAMPLE 1

Three hundred and forty-seven (347) parts of resorcine and 1.7 parts of sodium hydroxide were charged into a small-size autoclave provided with a thermometer, an agitator and a device for introducing nitrogen and/or an alkylene oxide, to form a mixture. The mixture so formed was agitated while purging the autoclave with nitrogen, heated to 130°–160° C. and incorporated slowly with 353 parts of ethylene oxide at a pressure of not higher than 5 kg/cm$^2$ for reaction therewith. The agitation was continued until the gauge pressure within the autoclave dropped to not higher than 0.1 kg/cm$^2$ after the end of introduction of the ethylene oxide. The reaction continued for about 30 minutes and produced a light-yellow, viscous liquid which was an adduct of resorcine with ethylene oxide (the average amount of ethylene oxide added, n in the formula (I) and (III) being 1.3).

Sixty-three (63) parts of the adduct so produced, 37 parts of acrylic acid, 0.1 part of hydroquinone, 1.0 part of p-toluenesulfonic acid and 10 parts of benzene were introduced into a four-necked flask provided with a reflux condenser and agitator to form a mixture which was reacted at 90°–110° C. under reflux of benzene, while blowing air into the flask, for 9 hours to obtain a reaction mixture having an acid value of 4.0. The reaction mixture so obtained was then heated to 110°–120° C. for two hours to remove the benzene therefrom thereby obtaining a light-yellow liquid material (y=2).

EXAMPLE 2

Two hundred and fifty-two (252) parts of pyrogallol and 1.2 parts of sodium hydroxide were reacted with 448 parts of ethylene oxide at not higher than 4 kg/cm$^2$, at 150°–180° C. in the same manner as in Example 1. The time needed for the reaction was 30 minutes and the reaction product obtained was a light-yellow viscous liquid which was a pyrogallol-ethylene oxide adduct (the average amount of ethylene oxide, n=1.7).

In the same manner as in Example 1, 60.2 parts of the adduct so obtained, 39.2 parts of acrylic acid, 0.1 part of hydroquinone, 1.0 part of p-toluenesulfonic acid and 10 parts of benzene were reacted together at 90°–110° C.

for 8 hours to obtain a reaction mixture having an acid value of 4.4. The reaction mixture so obtained was heated to 110°–120° C. for two hours to remove the benzene therefrom thereby obtaining a light-yellow liquid (y=3).

EXAMPLE 3

In the same manner as in Example 1, 134 parts of hydroquinone and 1.0 part of sodium hydroxide were reacted with 566 parts of propylene oxide at not higher than 5 kg/cm$^2$, at 180°–200° C. for 40 minutes thereby to obtain a hydroquinone-propylene oxide adduct (the average amount of propylene oxide added, n=4) which was a light-yellow viscous liquid.

In the same manner as in Example 1, 79.9 parts of the adduct so obtained, 20.1 parts of acrylic acid, 0.1 part of hydroquinone, 1.0 part of p-toluenesulfonic acid and 10.0 parts of benzene were reacted together at 90°–100° C. for 10 hours to produce a reaction mixture having an acid value of 3.4. The reaction mixture so obtained was heated to 110°–120° C. for two hours to remove the benzene therefrom thereby obtaining a light-yellow liquid (y=2).

EXAMPLE 4

In the same manner as in Example 1, 206 parts of catechol and 1.1 parts of sodium hydroxide were reacted with 494 parts of ethylene oxide at not higher than 5 kg/cm$^2$, at 120°–150° C. for 40 minutes thereby to obtain a catechol-ethylene oxide adduct (the average amount of ethylene oxide, n=3) which was a light-yellow viscous liquid. In the same manner as in Example 1, 72.2 parts of the adduct so obtained, 27.8 parts of acrylic acid, 0.1 part of hydroquinone, 1.0 part of p-toluenesulfonic acid and 10.0 parts of benzene were reacted together at 90°–110° C. for 9 hours to produce a reaction mixture having an acid value of 3.9. The reaction mixture so produced was then heated to 110°–120° C. for two hours to remove the benzene therefrom thereby obtaining a light-yellow liquid (y=2).

EXAMPLE 5

Two hundred and eighty-nine (289) parts of orcine and 1.5 parts of sodium hydroxide were reacted with 411 parts of ethylene oxide at not higher than 5 kg/cm$^2$, at 120°–150° C. for 30 minutes in the same manner as in Example 1 thereby to obtain an orcine-ethylene oxide adduct (the average amount of ethylene oxide added, n being 2) which was a light-yellow viscous liquid material.

In the same manner as in Example 1, 67.6 parts of the thus-obtained adduct 32.4 parts of acrylic acid, 0.1 part of hydroquinone, 1.0 part of p-toluenesulfonic acid and 10 parts of benzene were reacted together at 90°–110° C. for 10 hours to obtain a reaction mixture having an acid value of 4.5 which was then heated to 110°–120° C. for two hours to remove the benzene therefrom thereby obtaining a light-yellow liquid (y=3).

EXAMPLE 6

One hundred and thirty-six (136) parts of 4-methoxyresorcine and 1.0 part of sodium hydroxide were reacted with 564 parts of propylene oxide at not higher than 5 kg/cm$^2$, at 120°–150° C. for 45 minutes in the same manner as in Example 1 to produce a 4-methoxyresorcine-propylene oxide adduct (the average amount added, n=5) which was a light-yellow viscous liquid.

In the same manner as in Example 1, 80.6 parts of the adduct so produced, 19.4 parts of methacrylic acid, 0.1 part of hydroquinone, 1.0 part of p-toluenesulfonic acid and 10.0 parts of benzene were reacted together at 80°–100° C. for 13 hours to produce a reaction mixture having an acid value of 4.7 which was then heated to 100°–110° C. for 3 hours thereby obtaining a light-yellow liquid (y=2).

EXAMPLE 7

One hundred and nineteen (119) parts of 4-chlororesorcine and 1.0 part of sodium hydroxide were reacted with 581 parts of propylene oxide at not higher than 5 kg/cm$^2$, at 140°–170° C. for 40 minutes to obtain a 4-chlororesorcine-propylene oxide adduct (the average amount added, n=8) which was a light-yellow viscous liquid.

In the same manner as in Example 1, 83.0 parts of the adduct so obtained, 17.0 parts of methacrylic acid, 0.1 part of hydroquinone, 1.0 part of p-toluenesulfonic acid and 10.0 parts of benzene were reacted together at 80°–100° C. for 11 hours to produce a reaction mixture having an acid value of 6.0 which was then heated to 100°–110° C. for 3 hours to remove the benzene therefrom thereby obtaining a light-yellow liquid (y=2) having a viscosity of 0.7 poise/25° C. and an acid value of 5.5.

EXAMPLE 8

Each of the polyfunctional (meth)acrylic acid esters obtained in Example 1–7 as well as each of trimethylolpropane triacrylate and pentaerithritol thrimethacrylate was dissolved in the resin obtain in Reference example 1 to form a curable coating composition which was coated to a depth of 25μ on an acrylic primer-coated steel plate with the use of a roll coater and then irradiated with an electronic bean source located 10 cm apart from the plate and operated at an electronic beam current of 30 mA and a voltage of 300 KeV for acceleration in a nitrogen atmosphere until a dosage of 5 megarad was reached, thereby curing the coating on the plate perfectly. The results obtained are shown in Table 1.

Table 1

| | Resin (wt. %) | Diluent (wt.%) | Bond strength | Gloss of surface of coating | Bend test on coating (Bendability of coating |
|---|---|---|---|---|---|
| 1 | Resin of Reference example (60) | Trimethylolpropane triacrylate (40) | 50/100 | Acceptable | Cracked |
| 2 | example (50) | Pentaerithritol trimethacrylate (50) | 40/100 | Somewhat unsatisfactory | Cracked |
| 3 | example (50) | Diluent obtained in Example 1 (50) | 100/100 | Satisfactory | Satisfactory |
| 4 | example (45) | in Example 1 (50) in Example 2 (55) | 100/100 | Satisfactory | Somewhat cracked |
| 5 | example (50) | in Example 2 (55) in Example 3 (50) | 100/100 | Satisfactory | Satisfactory |
| 6 | example (50) | in Example 3 (50) in Example 4 (50) | 100/100 | Satisfactory | Satisfactory |
| 7 | | in Example 4 (50) | | | |

Table 1-continued

| | Resin (wt. %) | Diluent (wt.%) | Bond strength | Gloss of surface of coating | Bend test on coating (Bendability of coating |
|---|---|---|---|---|---|
| | example (50) | in Example 5 (50) | 100/100 | Satisfactory | Somewhat cracked |
| 8 | example (55) | in Example 5 (50) in Example 6 (45) | 100/100 | Satisfactory | Satisfactory |
| 9 | example (55) | in Example 6 (45) in Example 7 (45) | 100/100 | Satisfactory | Satisfactory |

In Table 1, the bond strength was measured by a cross-cut test, the gloss by visual inspection, and the bendability of the coating by bending at a right angle the coated steel plate with the coating being kept outside and visually inspecting the state of the coated plate so bent.

EXAMPLE 9

By using each of the polyfunctional acrylic acid esters obtained in Example 1-5, triethylene glycol diacrylate and pentaerithritol triacrylate as a diluent, together with the resin obtained in Reference example, there was prepared an ultraviolet light-curable, red-colored offset ink in accordance with the following standard formulation

| Formulation | |
|---|---|
| Carmine B(T) (Red pigment produced by Toyo Ink Mfg. Co. Ltd.) | 17.0 parts |
| Resin obtained in Reference example 2 | 51.0 Parts |
| Diluent | 22.0 Parts |
| Benzophenone | 8.0 Parts |
| 4,4'-bisdiethylaminobenzophenone | 2.0 Parts |
| Total | 100.0 Parts |

The inks so prepared were each printed on vinylic primer-coated tin plate in an amount of 30 mg/100 cm² by the use of a RI tester (produced by Akira Works, Japan), soon after which the printed tin plates were each placed on a conveyor and moved at a certain velocity (in terms of which the curing rate of the ink was indicated) 10 cm below a high pressure mercury lamp having an intensity of 80 w/cm for the irradiation thereof with ultraviolet rays from the lamp thereby to cure the coating on the tin plate. They were also each printed on art paper by the use of a Hidel KORD monocolor offset printer. The results obtained are shown in Table 2.

Table 2

| Ink No. | Diluent used | Curing rate (m/min.) | Bond strength | Gloss of printed surface | Bend test (Bendability) | Adaptability for offset printing |
|---|---|---|---|---|---|---|
| 1 | Pentaerithritol triacrylate | 80 | 0/100 | Somewhat unsatisfactory | Peeling occurred | 5,000 sheets printed without any problems |
| 2 | Triethylene glycol diacrylate | 50 | 40/100 | Acceptable | Cracked | After 3,000 sheets printed, blot found on subsequently printed sheets |
| 3 | Diluent obtained in Example 1 | 60 | 100/100 | Satisfactory | Satisfactory | 5,000 sheets printed without any problems |
| 4 | in Example 2 | 75 | 90/100 | Acceptable | Somewhat cracked | " |
| 5 | in Example 3 | 50 | 100/100 | Satisfactory | Satisfactory | " |
| 6 | in Example 4 | 65 | 100/100 | Satisfactory | Satisfactory | " |

What is claimed is:

1. A curable coating composition for paints, varnishes and printing inks comprising a (meth)acrylic acid ester represented by the following general formula

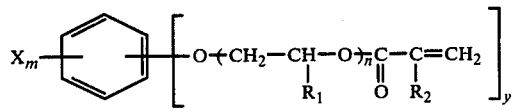

wherein X is selected from the group consisting of methyl and methoxy groups and chlorine atom, $R_1$ and $R_2$ are each a hydrogen atom or methyl group, m is zero or 1, y is an integer of 2 to 4, and n is an integer of 1 to 10.

2. The coating composition of claim 1 wherein y is 2 or 3.

3. The coating composition of claim 1 further comprising, as a binder component, an unsaturated group-containing resin selected from the group consisting of unsaturated polyesters prepared from ethylene glycol and maleic or fumaric acid; epoxy acrylate polymers prepared from acrylic acid and an epoxy compound containing at least two epoxides in the molecule; and resins prepared from acrylic acid and a hydroxyl group-containing resin containing β-hydroxyalkyl (meth)acrylate or allyl alcohol as one kind of the polymerization units.

4. The composition of claim 3 in which said (meth)acrylic acid ester and said unsaturated group-containing resin are present in amounts of 22–55% by weight and 45–55% by weight, respectively.

5. The composition of claim 3 characterized by being varoprizable solvent-free.

* * * * *